Oct. 13, 1970 P. STAMBERGER 3,533,113
SELF-INFLATABLE HOLLOW BODIES FOR USE AS
CUSHIONS AND FOR LIKE PURPOSES
Filed June 20, 1968 2 Sheets-Sheet 1
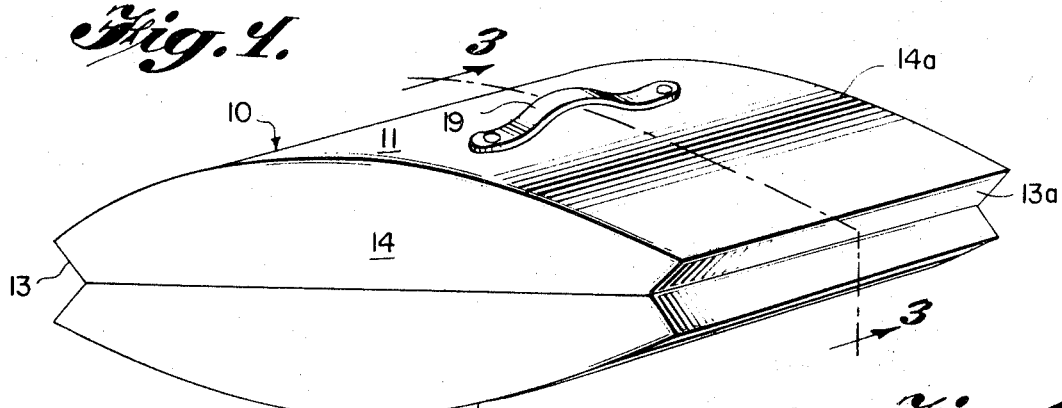
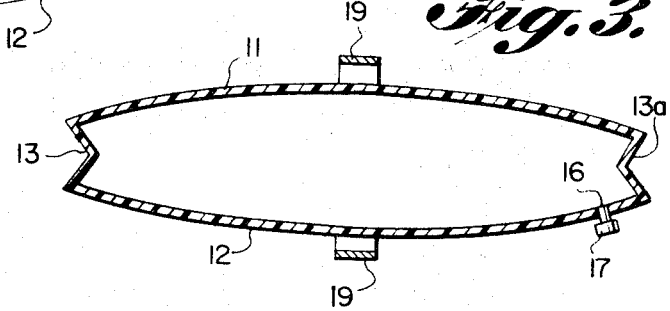
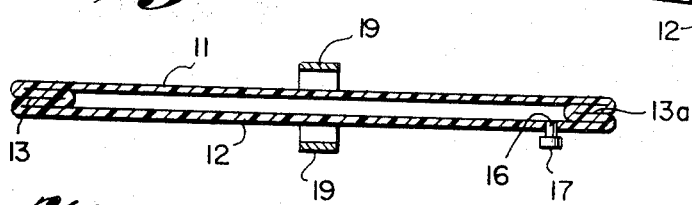
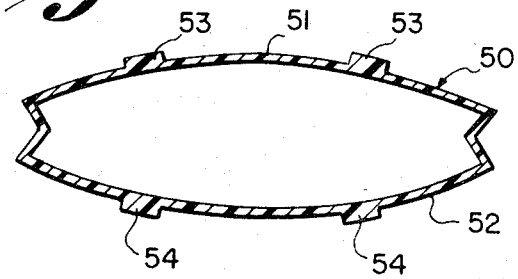
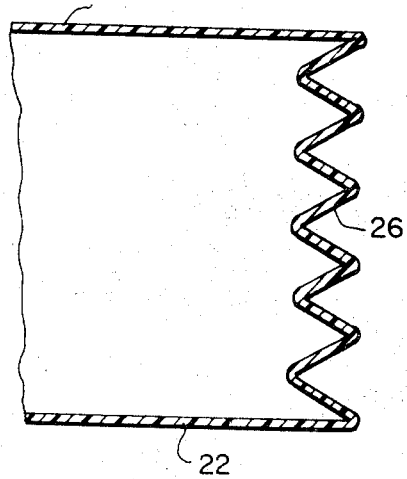
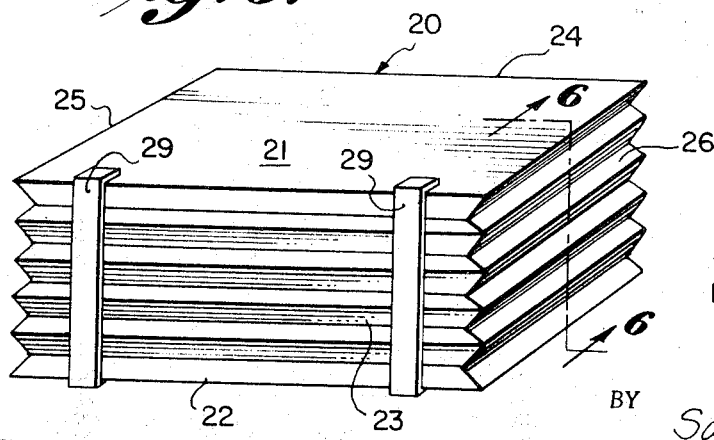
INVENTOR
PAUL STAMBERGER
BY Samuel Stearman
ATTORNEY Oct. 13, 1970
P. STAMBERGER
3,533,113
SELF-INFLATABLE HOLLOW BODIES FOR USE AS CUSHIONS AND FOR LIKE PURPOSES
Filed June 20, 1968
2 Sheets-Sheet 2
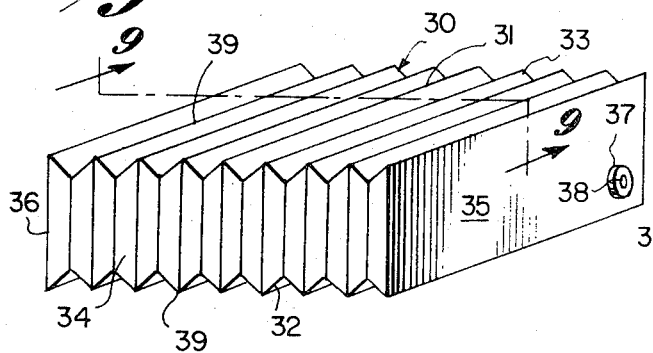
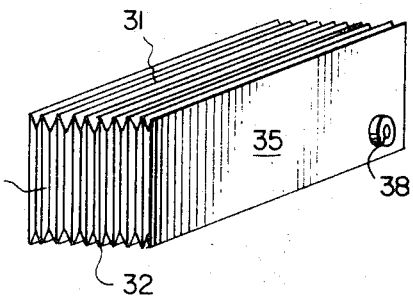
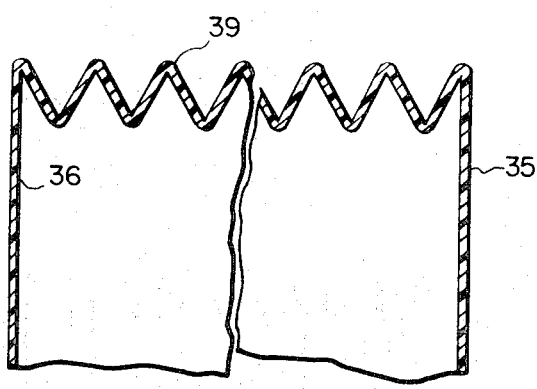
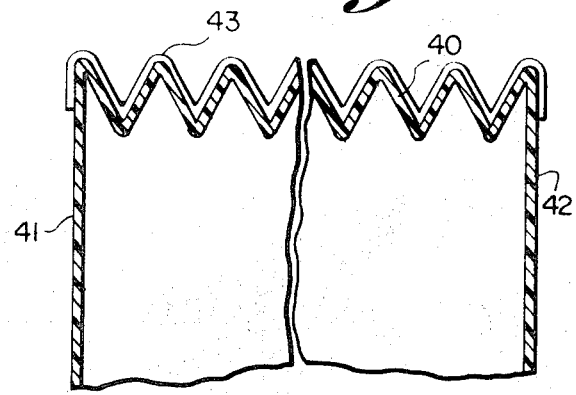
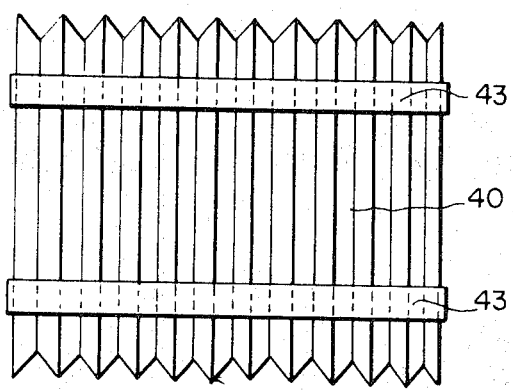
INVENTOR
PAUL STAMBERGER
BY Samuel Stearman
ATTORNEY United States Patent Office 3,533,113
Patented Oct. 13, 1970

3,533,113
SELF-INFLATABLE HOLLOW BODIES FOR USE AS CUSHIONS AND FOR LIKE PURPOSES
Paul Stamberger, 552 W. University Parkway,
Baltimore, Md. 21210
Continuation-in-part of application Ser. No. 453,252,
May 5, 1965. This application June 20, 1968, Ser.
No. 738,657
Int. Cl. A47c 27/08, 27/18
U.S. Cl. 5—348                                      8 Claims

ABSTRACT OF THE DISCLOSURE

Hollow bodies that are self-inflatable, to form pneumatic articles for use as pillows, mattresses, seat cushions, etc., are provided.

---

This application is a continuation-in-part of my copending application, Ser. No. 453,252, filed May 5, 1965 now abandoned.

This invention relates to self-inflatable hollow bodies, and more particularly to self-inflatable bodies constructed in a manner so as to constitute, when inflated, pneumatic articles for uses such as seat cushions, pillows, mattresses, and the like.

The principal object of the invention is to provide self inflatable bodies of the character aforesaid, which may readily be altered from the configuration they possess in their collapsed or noninflated condition, to an expanded, inflated configuration suitable for the intended actual use of the articles. For that purpose, the body is made so that it may be extended in one of its dimensions by a single pulling apart of two opposed walls of the body. The act of altering the configuration from that of the collapsed to that of the expanded forms will automatically suck air into the hollow body, in a quantity sufficient to enable the expanded form of the body to serve as a pneumatic article for the aforementioned uses, so long as the air thus sucked into the hollow body is retained therein.

The air may be sucked into the hollow body through an opening suitably disposed along and extending through one of the walls of the article. It is in the foregoing sense, viz, the automatic sucking of air into the hollow body in the act of altering the configuration from that which it possesses when collapsed to that which it possesses when expanded, in which I herein refer to the bodies as being self-inflatable or automatically inflatable.

The air thus sucked into the interior of the body for inflating the same, may be retained therein by a suitable closure or valve for the opening. Upon removal of the closure or upon appropriate change of position of the valve from closed to open setting, the body may readily be deflated and collapsed, and may be folded into a compact unit for ease in carrying and storage.

Another object of the invention is to provide self-inflatable hollow bodies adaptable for various uses, such as those referred to above, constructed so that they are automatically expandable to the configuration desired for its intended use, as well as self or automatically inflatable.

Still another object of the invention is to provide automatically inflatable articles of the character and for the purposes stated, formed from material which is sufficiently flexible to enable the body, in its collapsed form to be folded so that it will occupy a fraction of even the relatively small space it occupies when merely collapsed. Thus, the collapsed article in such instances may be small enough to be placed in one's pocket or otherwise conveniently carried about on one's person.

Still other objects and advantages of the invention will be more readily apparent from the detailed description below and from the accompanying drawing in which:

FIG. 1 is a perspective view illustrating an article embodying the invention, shown in its expanded, inflated configuration;

FIG. 2 is a view in cross-section, taken transversely of the article depicted in FIG. 1, and showing the same in its collapsed, deflated configuration;

FIG. 3 is a view in transverse cross-section taken along line 3—3 of FIG. 1;

FIG. 4 is a cross-sectional view illustrating a modification of the form of article depicted in FIGS. 1–3;

FIG. 5 is a perspective view illustrating another embodiment of the invention, in the expanded and inflated form of the article;

FIG. 6 is a fragmentary view in cross-section, taken along line 6—6 of FIG. 5;

FIG. 7 is a perspective view showing still another embodiment of the invention, in the expanded and inflated configuration of the article;

FIG. 8 is a perspective view showing the deflated or collapsed configuration of the article depicted in FIG. 7;

FIG. 9 is a fragmentary view in cross-section, taken along line 9—9 of FIG. 7;

FIG. 10 is a fragmentary view similar to FIG. 9, showing another embodiment; and FIG. 11 is a plan view of the embodiment shown in FIG. 10.

In carrying out the invention, the hollow bodies are preferably formed from air-impervious materials which are flexible but have a high modulus of elasticity when pulled or stretched. These properties are related to one another so that in the expanded, air-filled form of the body, it may be subjected to relatively heavy load and yet retain its expanded configuration without excessive deformation. At the same time, the flexibility is such that the hollow, expanded body may be readily collapsed when the air is released from the hollow interior thereof, by forcing two sides together.

In accordance with the invention, each of at least two of the sides of the body consists of at least one bellows-like convolution. When the body of the cushion is in its deflated configuration, the convolution is in its collapsed or folded configuration. Thus when the bellows-like convolutions are pulled apart, air is drawn into the interior of the body through an air inlet opening to inflate the same, the body of the cushion being thus filled with air.

To support the human body and to serve as a cushioning material, mattress, or the like, the dimensions in certain directions of the product must be held within fairly close limits. Thus, the vertical dimensions i.e., height of the expanded, inflated product must be only a fraction of its length and width. In terms of actual dimensions, the height of the product when inflated should range from about 2 inches to not more than about 6 inches.

Furthermore, the product must be so constructed and made of such air-impervious material that it will not deform in undesirable manner under the load of the person sitting or lying on its supporting surface, i.e., perpendicular to the load. Such deformation would tend to extend the length and/or width of the body, with a resultant decrease in the height thereof. Manifestly, to the extent that the height of the inflated body is decreased, the cushioning effect of the air in the deformed areas where the load is exerted will be lost, and hence will not furnish the user a stable support.

The foregoing imposes certain limitations upon the characteristics of the material and upon the structural form of the product. The material must be air-impervious and very flexible, so that when deflected it may be easily folded into a relatively small volume. It must also possess a high modulus, so the cushion or other article will resist deformation and will not stretch when inflated and under load. At the same time it must be characterized by sufficient tensile strength to support the weight of a human body, and not to break under sudden impact. The tensile strength of the material should accordingly be at least 1.5 to 2.0 lbs. per square inch.

In instances where the material will stretch considerably under load, a combination thereof with material which will not stretch is used, so that the latter also acts as reinforcement. In this manner, extension or stretching of the walls and consequent deformation of the cushion are prevented. This can be accomplished, for example by molding the wall so that portions thereof in certain areas are thicker than in other areas or by attaching thereto flexible but nonextensible, strips, straps, or cords.

A preferred material for forming the walls of a self-inflatable cushion or like article embodying the invention may comprise films of air-impervious polyesters such as polyethylene-terepthalate (one commercial variety of which is known as "Mylar") or other material with similar properties. These must be air-impervious and must must have a very high tensile strength, e.g., 17,000 to 30,000 p.s.i. at a film thickness of $\frac{1}{100}$ inch. They are also characterized by limited elongation at break.

As hereinabove stated, other air-impervious plastic materials that may be used for forming the walls of the cushions or other products hereof include suitable vinyl polymers and copolymers, plasticized vinyl chloride, polyethylene, polypropylene, suitably compounded natural and synthetic rubbers. All of these materials possess high tensile strength and relatively high modulus and flexibility. The aforementioned materials can be employed and formed either as unsupported films, or they may be combined over the entire surface or at spaced areas thereof with a woven material (such as cotton or fabric made from fibers or filaments of glass or other natural or synthetic material) or with nonwoven material, such as fibrous felt, paper, etc. A combination with a suitable high strength paper is a desirable embodiment of this invention.

The above-mentioned properties of the material and the cross-sectional thickness of the walls of the body will determine the functional characteristics for the intended use of the product.

In certain embodiments of the invention, the elasticity and configuration of the expansible walls of the body are such as to enable these walls to exhibit a spring-like action, thereby enabling the body to be automatically expansible from its collapsed, deflated form, without manual effort, and simultaneously thereby become at least partially automatically inflated for its intended use.

Typical of materials which may be utilized in the practice of the invention are air-impervious flexible thermoplastic resins such as polyethylene, polypropylene, suitable vinyl polymers and copolymers, butadiene-styrene copolymers, polyesters such as nylon, and the like. The material may, if necessary or desirable, be reinforced with fabric, and may also, if desired, be suitably colored or otherwise decorated.

The physical properties of the material forming the walls, and particularly the walls constituting the supporting surfaces of the hollow bodies hereof, may be and preferably are similar in respect of their tensile strength and flexibility to those of sheets of low density polyethylene.

Because of the differences in behavior of the great variety of suitable synthetic polymeric material under flexing and recovery, especially by varying the wall thickness, the stiffness in flexure of the expansible walls can vary within wide limits, for example, from 10,000 to 70,000 p.s.i, and will generally be average from 17,000 to 30,000 p.s.i.

Representative of sheet materials suitable for use in the practice of the invention are air-impervious plastic sheets of stiffness as shown in the tabulation herebelow, wherein the stiffness E, in p.s.i. is the result of stiffness tests conducted in accordance with ASTM D747–63, except that the minimum thickness requirement (0.02 in.) specified was waived.

| | Specification number | | | | |
|---|---|---|---|---|---|
| | 1 | 2 | 3 | 4 | 5 |
| Thickness, in | 0.0141 | 0.0164 | 0.0168 | 0.0174 | 0.0178 |
| Load scale reading (corrected) | 25.0 | 42.3 | 45.0 | 49.3 | 52.3 |
| E, p.s.i | 17,050 | 18,320 | 18,140 | 17,880 | 17,700 |
| Average stiffness | | 17,820 p.s.i. | | | |

In order to provide sufficient volume of air when the cushion is inflated, and a small size when deflated, at least two, but preferably four, of the walls are convolutions of a bellows-type configuration.

FIGS. 1–3 illustrate one embodiment of the invention, such as may be employed as a pillow or cushion. The expanded, inflated configuration of the body is shown in FIGS. 1 and 3 and the collapsed, deflated configuration thereof is shown in FIG. 2.

The body, indicated generally by numeral 10, has opponed walls, 11, 12 joined along their opposite longitudinal margins by walls 13, 13a and along their opposite transverse margins by walls 14, 14a. Each of the walls 13, 13a, 14, 14a are convolutions or of inverted V-shaped formations.

In this embodiment, as in the other embodiments illustrated and described, the thickness of the material utilized may be from $\frac{1}{8}$ to 5 millimeters, and will preferably be from $\frac{1}{4}$ to 2 millimeters.

An opening 16 is provided in one of the walls 11, 12, through which air is automatically drawn into the body upon movement of walls 11, 12 from the relative position shown in FIG. 2 to that shown in FIG. 1, and for expulsion of air from the inflated body when these walls are moved in the opposite direction to collapse the body. A removable closure or fast-acting valve 17 is provided for closing the opening 16 when the body has become inflated to the desired extent. If desired, handle means, such as illustrated at 19, are provided along the exposed surface of walls 11, 12, to facilitate manually moving these walls from the position shown in FIG. 2 to position shown in FIGS. 1 and 3, thereby to cause the body to become inflated.

The walls of the body or at least of the convolutions 13, 13a should have enough stiffness so that though capable of being pulled apart with relatively small force, they will not collapse immediately after inflation of the cushion and prior to closing of the valve 17.

FIG. 4 illustrates, in cross-section, an embodiment of the invention similar to that shown in FIGS. 1–3, but made from flexible material possessing an elasticity such that it does not offer adequate resistance against stretch and hence to deformation of the inflated cushion under load. In this embodiment, accordingly, the walls 51, 52 of the body 50 are provided with spaced thickened portions 53, 54 during the molding of the cushion, to serve as reinforcement—for preventing such deformation of the inflated cushion under load.

As will be noted, the weight supporting walls 11 and 12 of the embodiment shown in FIGS. 1–3, and likewise 51, 52 of the embodiment shown in FIG. 4 are of dimensions to enable them to take a convex contour when the body is inflated. Thus, a greater volume of air can be introduced into the body, and when the latter is compressed under load, the pressure of the air inside the body is increased, as is its load bearing capacity.

In the embodiment shown in FIGS. 5 and 6, the article, indicated generally by numeral 20, is of generally parallelepiped configuration. Walls 21, 22 may be integrally joined along the respective margins thereof to walls 23, 24, 25 and 26, each of which is formed with one or more convolutions similar to the configuration of a bellows. As is the case of the embodiment previously described, one of the walls 21, 22, is provided at a suitable location therein with an opening (not shown) for the admission of air into and release of air from the interior of the body. The opening is provided with any suitable form of closure, preferably a fast acting or automatically operating valve.

The air-impervious material of which walls 23, 24, 25, 26 are formed may have such elasticity that these walls are normally constrained to assume the expanded configuration if air can enter through the opening.

This embodiment is shown as including means incorporated therein for preventing undesired deformation or distortion of the expanded, inflated configuration of the article.

To prevent or minimize such distortion, the walls 23–24 have incorporated in or adhered to the outer surfaces thereof, cords or tapes such as indicated at 29, made of material which is flexible but nonextensible. The cords or tapes 29 are disposed so as to be firmly attached at the outwardly disposed vertices of the bellows-configured walls.

Since the above-mentioned distortion of the walls 23–26 may occur when these outwardly disposed ridge portions of the bellows are not held in fixed relation to one another when the body has been fully inflated and placed under load, the aforesaid securement of the flexible, but nonextensible cords or tapes 29 will serve to preclude substantial distortion. Yet, by means of the flexibility of the cords or tapes, they do not interfere with the deflation and collapsing of the article by exerting manual pressure on the outer surfaces of walls 21, 22, or with the folding of the collapsed body.

The walls 25, 26 (as also walls 13, 13a) of the embodiment of FIGS. 1–3 can also be constructed in sections when the stiffness of the material reduces the flexibility or foldability, by interposing sections made from a highly flexible material along spaced longitudinal portions of these walls, between sections thereof made from material which may possess undesired stiffness.

The embodiment of the invention shown in FIGS. 7 to 9, comprises a body 30 of parallelepiped shape, having top and bottom walls 31, 32 and side walls 33, 34, formed and connected with one another to form a structure somewhat similar in shape to that of an accordion. At their respective corresponding end edges, the walls 31–34 are connected to end walls 35, 36, preferably integrally. An opening 37 is provided with a closure or valve 38, formed in one or both of the end walls, for admission and release of air into and from the interior of the body. The construction is such that the collapsed body can readily be extended by a single pulling action (exerted on walls 35, 36, in a direction to draw them further apart) to a suitable length. At the same time, the interior of the body will become substantially filled with air drawn in through opening 37, so that when the closure is inserted (or the valve closed) in opening 37, the air will be retained in the body, enabling it to serve as an air cushion.

As will be noted from FIG. 7, each of the two opposed walls 31, 32 has a surface area which is substantially greater than, and is preferably a multiple of the surface area of each of the walls 33, 34.

For convenience of description, the two larger walls 31, 32 are herein referred to as the top and bottom walls of the accordion-shaped body, and the walls 33, 34 are referred to herein as the side walls thereof. In normal use as a cushion, one or the other of the walls 31, 32 will constitute the supporting surface or seat of the cushion.

The flexibility and elasticity of the material of which walls 31, 32, 33, 34 are formed is such that in the extended and air filled form of the body, the vertices or ridges 39 of the walls 31, 32 of the accordion-like surface become more or less flattened out under load applied to the surface, so that these walls are comfortable to the portion of the user's body sitting or resting thereon.

To serve as an automatically inflatable structure which is to support the human body and especially as a cushioning device, it is desirable that the dimensions thereof be confined to rather narrow limits. Thus, the height of walls 33, 34, 35, 36 should be preferably about 2 to 3 inches, and not over 6 inches.

As above indicated, walls 31–34 must be of a character such that the cushion will not undergo any substantial distortion or deformation in a direction perpendicular to the load. If the walls are not dimensionally stable to stretch, the air would be forced from area of load to area of no load, which will then be excessively expanded, and in consequence, the cushioning effect of the air would be lost or substantially lowered.

It is primarily with the foregoing in mind, that the top, bottom and side walls of the cushions or similar articles embodying the invention are formed of material or composite materials which have resistance to stretch by reason of having modulus of elasticity sufficiently high to prevent linear distortion and deformation of the inflated cushion under load. Not only must the material be air-impervious flexible in order to serve its intended purpose, and to be easily foldable in the deflated condition of the cushion or other article, as above explained, but must have resistance to stretch under the load of the human body. As will be understood, the material of which the aforementioned parts of the cushion or like device is constructed, must also possess sufficient tensile strength (e.g., a minimum of 1.5 to 2 lbs. per square inch) to support the weight of a human body and not to break under sudden impact. In lieu of the above-mentioned plastic materials which may be employed, air impervious relatively high-strength paper may be utilized for forming self-inflatable cushions or like articles embodying the present invention. Although the material employed for the top, bottom and side walls is preferably one which is characterized by a high modulus of elasticity as above set forth, there may also be employed a combination of flexible material that is extensible and elastic, with a reinforcement composed of a flexible and nonextensible material, which is advisable when the thickness of the wall is low.

Such a structure is illustrated in FIGS. 10–11.

The reinforcement desirably may be in the form of cords, strips or straps 41 adhesively attached to or otherwise incorporated, for example by molding the same, in the walls of the cushion body at suitable intervals. The reinforcing strips are secured to the walls, e.g., walls 31, 32 so as to extend fully or partly into the valleys of the convolutions, thereby controlling the dimensions to which the wall will be confined when subjected to load.

In lieu of material that is flexible and extensible but reinforced with nonextensible material, there may be employed coated fabrics such as rubber-coated woven or unwoven material such as felt, or air-tight paper coated or impregnated so as to retain the air when in the form of an inflated cushion. Also when paper is used, for a single use, or disposable item, the closure may be made of a pressure-sensitive adhesive coated material.

There can also be used a composite product obtained by laminating relatively wide strips of flexible nonextensible material to extensible plastic material.

I claim:

1. A self-inflatable seat cushion or the like article comprising top, bottom, side and end walls connected in air tight relation to form a hollow body, said top and bottom walls having substantially equal shapes and dimensions, and all of said walls being air-impervious, relatively thin and flexible and non-stretchable, and said side and end walls each being of bellows configuration, said top and bottom walls normally being disposed in close parallel relation with the convolutions of said side and end members disposed between the marginal edges of said top and bottom walls when said hollow body is in its normal deflated condition, in which condition said seat cushion or the like may be readily folded for carrying and storage purposes, one of said walls having an air opening therein connecting with the interior of said hollow body, and closure means for said opening, whereby said side and end walls due to their bellows like configuration will permit said top and bottom walls to be pulled apart from their normal closely adjacent position to a spaced apart substantially parallel position, which movement will draw air into said hollow body defined by said walls which air will be retained therein when said air opening is closed by said closure means to thus form the desired inflated seat cushion or the like, and will be expelled therefrom when said closure is removed from said air opening and said top and bottom walls are moved to their normal closely adjacent position.

2. A self-inflatable cushion as defined in claim 1, wherein the surface area of each of said top and bottom walls is a multiple of the surface area of each of said side and end walls when the cushion has been inflated.

3. A self-inflatable cushion or like article as defined in claim 1, wherein the modulus of elasticity of said side and end walls is not sufficiently high to prevent deformation when said body is inflated and a load is applied to said top wall, and wherein flexible strips of nonextensible material are incorporated, in said side and end walls and serve to reinforce the same against said deformation.

4. A self-inflatable cushion or like article as defined in claim 1, wherein the modulus of elasticity of said top and bottom walls is not sufficiently high to prevent deformation when said body is inflated and a load is applied to said top wall, and wherein said deformation is prevented by increasing the thickness of said walls along transversely spaced areas thereof.

5. A self-inflatable cushion or like article as defined in claim 1, and having handle means on the outer surface of said top and bottom walls for moving said walls away from one another from the position they occupy when the body is deflated, whereby to extend the body and cause it to become inflated by the entrance of air through said opening.

6. A self-inflatable cushion or like article as defined in claim 1, wherein said walls are of a thickness of from about 1/8 to 5 mm.

7. A self-inflatable cushion or like article as defined in claim 1, having its walls formed of flexible air-impervious, plastic material having a tensile strength of at least 1.5 p.s.i. in a wall thickness of 1 mil, and an elongation not in excess of 100% at break, whereby the cushion will not be substantially deformed when inflated and under load.

8. A self-inflatable seat cushion or the like consisting essentially of a hollow body composed of relatively stiff but flexible plastic material, said body having top and bottom end walls, and an opposed pair of end walls, an opposed pair of side walls of a bellows configuration joined to each of said top, bottom and end walls in air tight relation, one of said end walls having an opening for admitting air into and for escape of air from the interior of said hollow body, closure means for said opening, said side walls of a bellows configuration having spaced, flexible, but nonextensible means positioned on the surface of said body so as to be secured to each of said end walls and to the intervening outwardly disposed vertices of said bellows configuration of said side walls.

References Cited
UNITED STATES PATENTS

| | | | |
|---|---|---|---|
| 396,242 | 1/1889 | Simon | 5—348 X |
| 2,360,715 | 10/1944 | Perry | 5—348 |
| 2,814,053 | 11/1957 | Sevcik | 5—348 |
| 3,068,494 | 12/1962 | Pinkwater | 5—348 |
| 3,251,075 | 5/1966 | Saltness | 5—348 X |
| 3,316,567 | 5/1967 | Yagi | 5—348 |

CASMIR A. NUNBERG, Primary Examiner

U.S. Cl. X.R.

297—456